United States Patent
Diachina et al.

(10) Patent No.: US 9,999,022 B2
(45) Date of Patent: Jun. 12, 2018

(54) PAGING EXTENSION FOR ENHANCED COVERAGE GLOBAL SYSTEM FOR MOBILE (EC-GSM)

(71) Applicant: TELEFONAKTIEBOLAGET LM ERICSSON (PUBL), Stockholm (SE)

(72) Inventors: John Walter Diachina, Garner, NC (US); Jens Bergqvist, Linköping (SE); Nicklas Johansson, Brokind (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/716,327

(22) Filed: Sep. 26, 2017

(65) Prior Publication Data
US 2018/0020425 A1 Jan. 18, 2018

Related U.S. Application Data

(62) Division of application No. 15/098,212, filed on Apr. 13, 2016, now Pat. No. 9,788,301.
(Continued)

(51) Int. Cl.
*H04W 4/00* (2018.01)
*H04B 7/00* (2006.01)
(Continued)

(52) U.S. Cl.
CPC ........ *H04W 68/08* (2013.01); *H04W 68/005* (2013.01); *H04W 68/02* (2013.01);
(Continued)

(58) Field of Classification Search
CPC ........................................ H04W 68/00–68/12
(Continued)

(56) References Cited

U.S. PATENT DOCUMENTS

| 7,653,394 | B2 * | 1/2010 | McMillin | H04L 45/00 370/331 |
| 2008/0076419 | A1 * | 3/2008 | Khetawat | H04L 12/66 455/435.1 |

(Continued)

FOREIGN PATENT DOCUMENTS

CN 101 662 805 A 3/2010

OTHER PUBLICATIONS

Ericsson: "EC-GSM—Mapping of logical channels onto physical channels". 3GPP TSG GERAN Ad Hoc#1 on FS_IoT_LC. Tdoc GPC150055. Agenda item 1.4.3.1. Sofia Antipolis, France. Feb. 2-5, 2015, the whole document.
(Continued)

*Primary Examiner* — Joshua Schwartz

(57) ABSTRACT

A radio access network (RAN) node, a wireless device and various methods are described herein for managing paging bandwidth. In one embodiment, the RAN node transmits a message (e.g., paging message, assignment message) to wireless devices, where the message comprises at least the following: (i) a page mode field which includes information indicating one or more coverage classes for which one or more paging messages were available for transmission during a time interval but were not transmitted to a plurality of wireless devices; and (ii) a used_downlink_coverage class field which includes information indicating a coverage class associated with the transmitted message.

19 Claims, 6 Drawing Sheets

Related U.S. Application Data

(60) Provisional application No. 62/147,527, filed on Apr. 14, 2015.

(51) Int. Cl.
   | | |
   |---|---|
   | *H04W 68/08* | (2009.01) |
   | *H04W 68/02* | (2009.01) |
   | *H04W 68/00* | (2009.01) |
   | *H04W 68/06* | (2009.01) |
   | *H04W 72/04* | (2009.01) |
   | *H04W 72/10* | (2009.01) |

(52) U.S. Cl.
   CPC ....... *H04W 68/06* (2013.01); *H04W 72/0446* (2013.01); *H04W 72/10* (2013.01)

(58) Field of Classification Search
   USPC .............................................. 455/426.1, 515
   See application file for complete search history.

(56) References Cited

U.S. PATENT DOCUMENTS

| | | | | |
|---|---|---|---|---|
| 2010/0220680 A1* | 9/2010 | Ramankutty | ......... | H04W 68/08 370/329 |
| 2013/0136164 A1 | 5/2013 | Ronc | | |
| 2015/0382320 A1* | 12/2015 | Rune | ....................... | H04W 4/20 455/426.1 |
| 2016/0174188 A1* | 6/2016 | Kim | ....................... | H04W 68/02 455/458 |
| 2016/0338006 A1* | 11/2016 | Lee | ................... | H04W 52/0229 |

OTHER PUBLICATIONS

Ericsson LM: "Pseudo CR 45.869—Introduction of short and long sync up procedures", 3GPP TSG GERAN#65. GP-150129. Agenda item 7.1.5.3.4. Shanghai, P.R. China, Mar. 9-13, 2015, the whole document.

3GPP TS 44.018 V12.5.0 (Mar. 2015), 3rd Generation Partnership Project; Technical Specification Group GSM/EDGE Radio Access Network; Mobile radio interface layer 3 specification; Radio Resource Control (RRC) protocol (Release 12), the whole document.

Ericsson LM: "EC-GSM, AGCH assignment messages", 3GPP TSG GERAN#65, Tdoc GP-150167. Agenda item 7.2.5.3.4. Shanghai, P.R. China, Mar. 9-13, 2015, the whole document.

* cited by examiner

US 9,999,022 B2

PAGING EXTENSION FOR ENHANCED COVERAGE GLOBAL SYSTEM FOR MOBILE (EC-GSM)

CLAIM OF PRIORITY

This application is a divisional application of U.S. patent application Ser. No. 15/098,212 filed on Apr. 13, 2016, issued as U.S. Pat. No. 9,788,301 on Oct. 10, 2017, which claimed the benefit of priority to U.S. Provisional Application Ser. No. 62/147,527, filed on Apr. 14, 2015. The entire contents of each of these applications are hereby incorporated by reference for all purposes.

TECHNICAL FIELD

The present disclosure relates generally to the wireless communications field and, more particularly, to a radio access network node, a wireless device and various methods for managing paging bandwidth.

BACKGROUND

The following abbreviations and terms are herewith defined, at least some of which are referred to within the following description of the present disclosure.
3GPP 3rd-Generation Partnership Project
AGCH Access Grant Channel
ASIC Application Specific Integrated Circuit
BLER Block Error Rate
BSS Base Station Subsystem
CC Coverage Class
CIoT Cellular Internet of Things
CN Core Network
DRX Discontinuous Receive Cycle
EC-AGCH Extended Coverage Access Grant Channel
EC-GSM Extended Coverage Global System for Mobile Communications
EC-PCH Extended Coverage Paging Channel
eDRX Extended Discontinuous Receive Cycle
eNB Evolved Node B
DSP Digital Signal Processor
EDGE Enhanced Data rates for GSM Evolution
EGPRS Enhanced General Packet Radio Service
FS Feasibility Study
GSM Global System for Mobile Communications
GERAN GSM/EDGE Radio Access Network
GPRS General Packet Radio Service
HARQ Hybrid Automatic Repeat Request
IE Information Element
IMSI International Mobile Subscriber Identity
IoT Internet of Things
LC Low Complexity
LTE Long-Term Evolution
MCS Modulation and Coding Scheme
MF Multiframe
MME Mobility Management Entity
MS Mobile Station
MTC Machine Type Communications
NB Node B
PCH Paging Channel
PDN Packet Data Network
PDTCH Packet Data Traffic Channel
P-TMSI Packet Temporary Mobile Subscriber Identity
RACH Random Access Channel
RAN Radio Access Network
RAT Radio Access Technology
SGSN Serving GPRS Support Node
TBF Temporary Block Flow
TDMA Time Division Multiple Access
TSG Technical Specifications Group
UE User Equipment
WCDMA Wideband Code Division Multiple Access
WiMAX Worldwide Interoperability for Microwave Access Internet of Things (IoT) devices: The Internet of Things (IoT) is the network of physical objects or "things" embedded with electronics, software, sensors, and connectivity to enable objects to exchange data with the manufacturer, operator and/or other connected devices based on the infrastructure of the International Telecommunication Union's Global Standards Initiative. The Internet of Things allows objects to be sensed and controlled remotely across existing network infrastructure creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Experts estimate that the IoT will consist of almost 50 billion objects by 2020.

Cellular Internet of Things (IoT) devices: CIoT devices are IoT devices that establish connectivity using cellular networks.

Coverage Class (CC): At any point in time a wireless device belongs to a specific uplink/downlink coverage class that corresponds to either the legacy radio interface performance attributes that serve as the reference coverage for legacy cell planning (e.g., a Block Error Rate of 10% after a single radio block transmission on the PDTCH) or a range of radio interface performance attributes degraded compared to the reference coverage (e.g., up to 20 dB lower performance than that of the reference coverage). Coverage class determines the total number of blind transmissions to be used when transmitting/receiving radio blocks. An uplink/downlink coverage class applicable at any point in time can differ between different logical channels. Upon initiating a system access a wireless device determines the uplink/downlink coverage class applicable to the RACH/AGCH based on estimating the number of blind transmissions of a radio block needed by the BSS (radio access network node) receiver/wireless device receiver to experience a BLER (block error rate) of approximately 20%. The BSS determines the uplink/downlink coverage class to be used by a wireless device on the assigned packet channel resources based on estimating the number of blind transmissions of a radio block needed to satisfy a target BLER and considering the number of HARQ retransmissions (of a radio block) that will, on average, be needed for successful reception of a radio block using that target BLER. Note: a wireless device operating with radio interface performance attributes corresponding to the reference coverage (normal coverage) is considered to be in the best coverage class (i.e., coverage class 1) and therefore makes a single blind transmission. In this case, the wireless device may be referred to as a normal coverage wireless device. In contrast, a wireless device operating with radio interface performance attributes corresponding to an extended coverage (i.e., coverage class greater than 1) makes multiple blind transmissions. In this case, the wireless device may be referred to as an extended coverage wireless device.

eDRX: Extended Discontinuous Receive Cycle (eDRX), also labelled as eDiscontinuous reception, is a process of a wireless device disabling its ability to receive when it does not expect to receive incoming messages and enabling its ability to receive during a period of reachability when it anticipates the possibility of message reception. For eDRX to operate, the network coordinates with the wireless device regarding when instances of reachability are to occur. The wireless device will therefore wake up and enable message reception only during pre-scheduled periods of reachability. This process reduces the power consumption which extends the battery life of the wireless device and is sometimes called (deep) sleep mode.

Extended Coverage: The general principle of extended coverage is that of using blind transmissions for the control channels and for the data channels. In addition, for the data channels the use of blind transmissions assuming MCS-1 (i.e., the lowest modulation and coding scheme (MCS) supported in EGPRS today) is combined with HARQ retransmissions to realize the needed level of data transmission performance. Support for extended coverage is realized by defining different coverage classes. A different number of blind transmissions are associated with each of the coverage classes wherein extended coverage is associated with coverage classes for which multiple blind transmissions are needed (i.e., a single blind transmission is considered as the reference coverage). The number of total blind transmissions for a given coverage class can differ between different logical channels.

Nominal Paging Group: The specific set of EC-PCH blocks a device monitors once per eDRX cycle. The device determines this specific set of EC-PCH blocks using an algorithm that takes into account its IMSI, its eDRX cycle length and its downlink coverage class.

The 3GPP TSG-GERAN Ad Hoc#1 on FS_IoT_LC Tdoc GPC150055, entitled "EC-GSM—Mapping of Logical Channels onto Physical Channels", dated Feb. 2-5, 2015 (the contents of which are incorporated herein by reference for all purposes) disclosed that the extended coverage requirements for Cellular Internet of Things (CIoT) devices can be realized on the EC-PCH by using a new 2-burst EC-PCH radio block, where the number of EC-PCH radio blocks needed to send an EC-PCH message depends on the coverage situation for the device, and thus, how many times the EC-PCH message needs to be repeated in order to reach the needed coverage extension. The number of EC-PCH radio blocks needed to send the required number of blind transmissions of an EC-PCH message ranges from 1, for devices (wireless devices) in the best (e.g., lowest) coverage class, to 32, for devices in the worst (e.g., highest) coverage class, due to the different amount of repetitions that are used when transmitting the message. Each EC-PCH message is contained within a single EC-PCH radio block, which will include space for up to 88 bits of payload. FIG. 1 (PRIOR ART) is a diagram that illustrates the EC-PCH mapping for devices (wireless devices) in the best (e.g., lowest) coverage class CC1 which requires 1 message (one 2-burst EC-PCH radio block), coverage class CC2 which requires two messages (two 2-burst EC-PCH radio blocks), coverage class CC3 which requires four messages (four 2-burst EC-PCH radio blocks), coverage class CC4 which requires eight messages (eight 2-burst EC-PCH radio blocks), coverage class CC5 which requires 16 messages (16 2-burst EC-PCH radio blocks), and coverage class CC6 which requires 32 messages (32 2-burst EC-PCH radio blocks) where CC6 is the worst (e.g., highest) coverage class.

The traditional methods for PCH bandwidth management (not EC-PCH bandwidth management) are based on the assumption that all devices (wireless devices) are of the same coverage class, which means that each nominal paging group is based on the transmission of a single PCH message that is sent using a 4-burst radio block. In addition, the traditional methods are based on the assumption that all devices (wireless devices) in the same serving cell make use of the same Discontinuous Receive (DRX) cycle length. This means that even if a device fails to read a message (e.g., a PCH or AGCH message) when the device wakes-up according to its nominal paging group, the device will have another opportunity to attempt message reception in the near future (i.e., a few seconds later). The traditional BSS therefore employs a PCH bandwidth management method that is based on these two key assumptions, neither of which is applicable to an Extended Coverage GSM (EC-GSM) system, where devices (wireless devices) may operate in different coverage classes and may make use of different eDRX cycle lengths. In the EC-GSM system, the bandwidth available for sending EC-PCH messages per the standardized 51-multiframe is limited due to the need for a BSS to also send EC-AGCH messages which also use different coverage classes. This bandwidth problem associated with EC-PCH and EC-AGCH resource management is addressed by the present disclosure.

SUMMARY

A radio access network (RAN) node (e.g., BSS, NodeB, eNodeB), a wireless device (e.g., MS, CIoT device) and various methods for addressing the aforementioned problem are described in the independent claims. Advantageous embodiments of the radio access network (RAN) node (e.g., BSS, NodeB, eNodeB), the wireless device (e.g., MS, CIoT device) and the various methods are further described in the dependent claims.

In one aspect, the present disclosure provides a RAN node configured to interact with a plurality of wireless devices. The RAN node comprises a processor and a memory that stores processor-executable instructions, wherein the processor interfaces with the memory to execute the processor-executable instructions, whereby the RAN node is operable to perform a transmit operation. In the transmit operation, the RAN node transmits to the plurality of wireless devices a message during a time interval, where the message comprises at least the following: (i) a page mode field which includes information indicating one or more coverage classes for which one or more paging messages were available for transmission during the time interval but were not transmitted to the plurality of wireless devices; and (ii) a used_downlink_coverage_class field which includes information indicating a coverage class associated with the transmitted message. An advantage of the RAN node implementing this operation is that it helps address a bandwidth problem associated with EC-PCH and EC-AGCH resource management in a wireless communication network.

In another aspect, the present disclosure provides a method in a RAN node configured to interact with a plurality of wireless devices. The method comprises a transmitting step. In the transmitting step, the RAN node transmits to the plurality of wireless devices a message during a time interval, where the message comprises at least the following: (i) a page mode field which includes information indicating one or more coverage classes for which one or more paging messages were available for transmission during the time interval but were not transmitted to the plurality of wireless devices; and (ii) a used_downlink_coverage_class field which includes information indicating a coverage class associated with the transmitted message. An advantage of the RAN node implementing this step is that it helps address a bandwidth problem associated with EC-PCH and EC-AGCH resource management in a wireless communication network.

In yet another aspect, the present disclosure provides a wireless device configured to interact with a RAN node. The wireless device comprises a processor and a memory that stores processor-executable instructions, wherein the processor interfaces with the memory to execute the processor-executable instructions, whereby the wireless device is operable to perform a receive operation. In the receive operation, the wireless device receives from the RAN node a message over a time interval, where the message comprises at least the following: (i) a page mode field which includes information indicating one or more coverage classes for which one or more paging messages were available for transmission by the RAN node during the time interval but were not transmitted; and (ii) a used_downlink_coverage_class field which includes information indicating a coverage class associated with one or more wireless devices addressed in the received message. An advantage of the wireless device implementing this operation is that it helps address a bandwidth problem associated with EC-PCH and EC-AGCH resource management in a wireless communication network.

In still yet another aspect, the present disclosure provides method in a wireless device configured to interact with a RAN node. The method comprises a receiving step. In the receiving step, the wireless device receives from the RAN node a message over a time interval, where the message comprises at least the following: (i) a page mode field which includes information indicating one or more coverage classes for which one or more paging messages were available for transmission by the RAN node during the time interval but were not transmitted; and (ii) a used_downlink_coverage_class field which includes information indicating a coverage class associated with one or more wireless devices addressed in the received message. An advantage of the wireless device implementing this step is that it helps address a bandwidth problem associated with EC-PCH and EC-AGCH resource management in a wireless communication network.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings.

DETAILED DESCRIPTION

Figure 1:
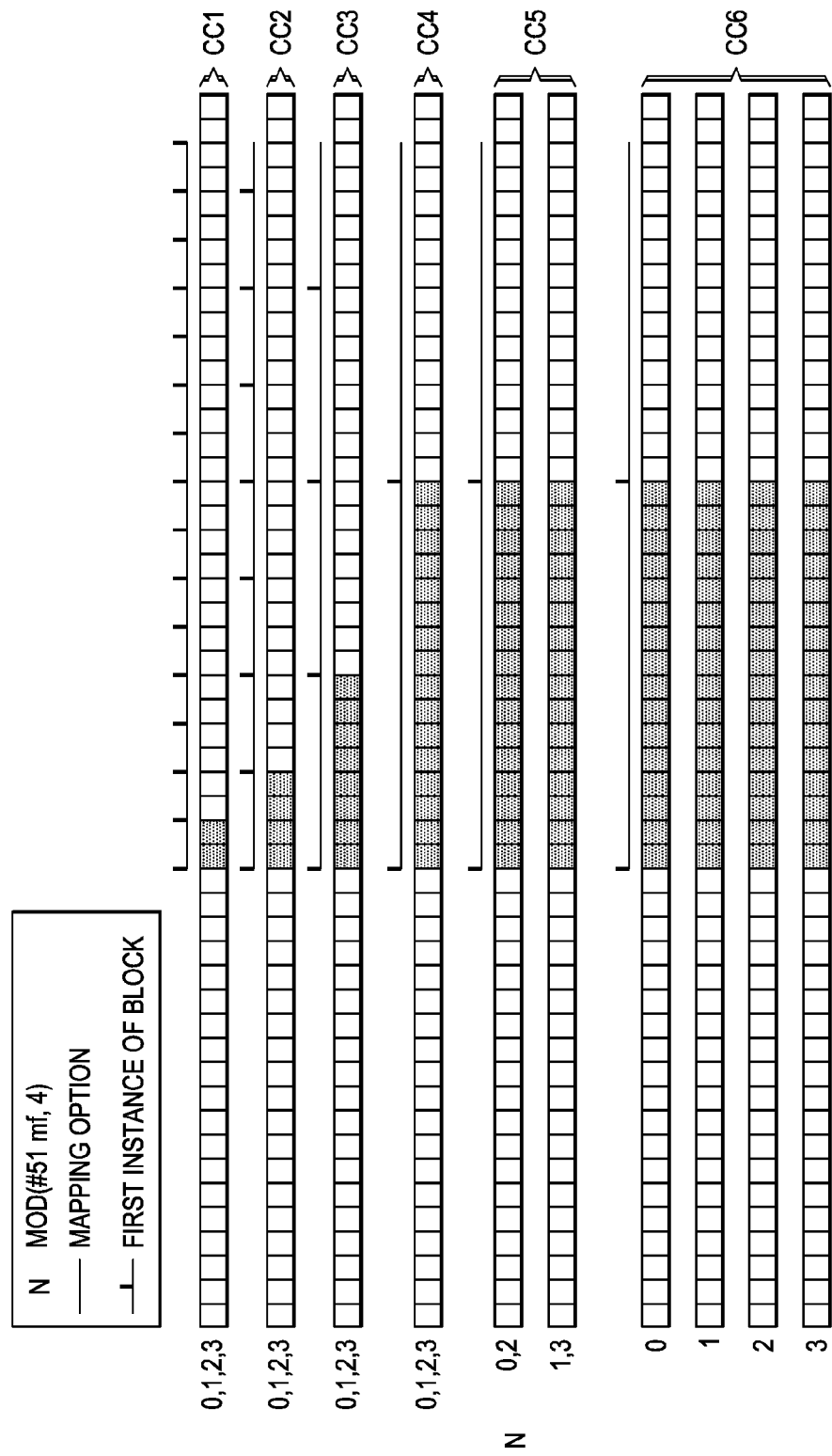
FIG. 1 (PRIOR ART) is a diagram that illustrates the EC-PCH mapping for wireless devices associated with CC1, CC2, CC3, CC4, CC5 and CC6.

A discussion is provided first herein to describe an exemplary wireless communication network that includes a CN node (e.g., SGSN, MME), multiple RAN nodes (e.g., BSSs, NodeBs, eNodeBs), and multiple wireless devices (e.g., MSs, CIoT devices) in accordance with an embodiment of the present disclosure (see FIG. 1). Then, a discussion is provided to disclose different techniques that the RAN node can use to effectively manage EC-PCH and EC-AGCH resources in accordance with various embodiments of the present disclosure (see FIGS. 2-4). Thereafter, a discussion is provided to explain the basic functionalities-configurations of the RAN node (e.g., BSS, NodeB, eNodeB) and the wireless device (e.g., MS, CIoT device) in accordance with different embodiments of the present disclosure (see FIGS. 5-11).

Exemplary Wireless Communication Network 200

Figure 2:
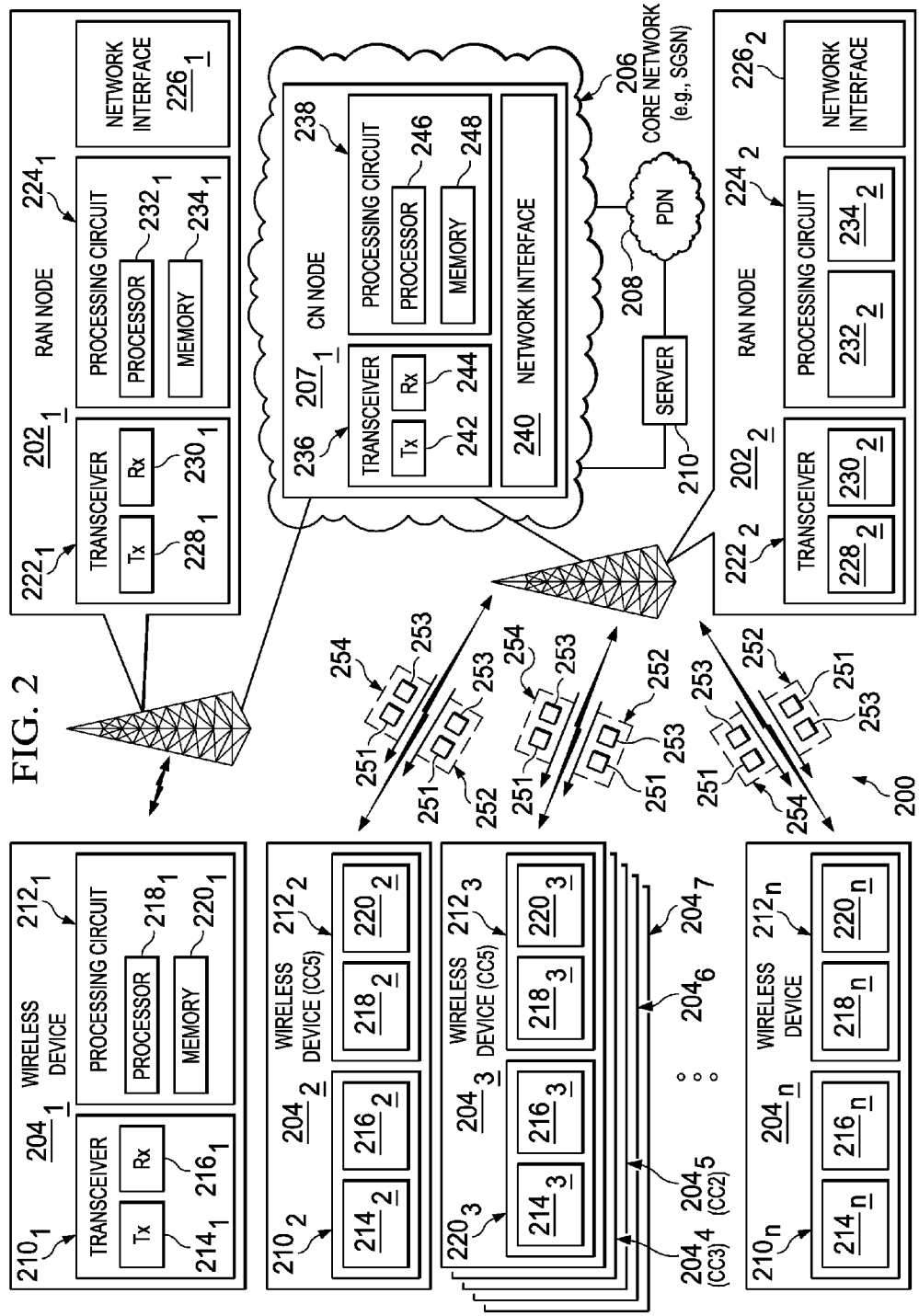
FIG. 2 is a diagram of an exemplary wireless communication network which includes a CN node, multiple RAN nodes, and multiple wireless devices which are configured in accordance with an embodiment of the present disclosure.

Referring to FIG. 2, there is illustrated an exemplary wireless communication network 200 in accordance with the present disclosure. The wireless communication network 200 includes a core network 206 (which comprises at least one CN node $207_1$) and multiple RAN nodes $202_1$ and $202_2$ (only two shown) which interface with multiple wireless devices $204_1, 204_2, 204_3, 204_4, 204_5, 204_6, 204_7 \ldots 204_n$. The wireless communication network 200 also includes many well-known components, but for clarity, only the components needed to describe the features of the present disclosure are described herein. Further, the wireless communication network 200 is described herein as being a GSM/EGPRS wireless communication network 200 which is also known as an EDGE wireless communication network 200. However, those skilled in the art will readily appreciate that the techniques of the present disclosure which are applied to the GSM/EGPRS wireless communication network 200 are generally applicable to other types of wireless communication systems, including, for example, WCDMA, LTE, and WiMAX systems.

The wireless communication network 200 includes the RAN nodes $202_1$ and $202_2$ (wireless access nodes-only two shown) which provide network access to the wireless devices $204_1, 204_2, 204_3, 204_4, 204_5, 204_6, 204_7 \ldots 204_n$. In this example, the RAN node $202_1$ is providing network access to wireless device $204_1$ while the RAN node $202_2$ is providing network access to wireless devices $204_2$, $204_3$, $204_4$, $204_5$, $204_6$, $204_7$ ... $204_n$. The RAN nodes $202_1$ and $202_2$ are connected to the core network 206 (e.g., SGSN core network 206) and, in particular, to the CN node 207 (e.g., SGSN 207). The core network 206 is connected to an external packet data network (PDN) 208, such as the Internet, and a server 210 (only one shown). The wireless devices $204_1$, $204_2$, $204_3$, $204_4$, $204_5$, $204_6$, $204_7$ ... $204_n$ may communicate with one or more servers 210 (only one shown) connected to the core network 206 and/or the PDN 208.

The wireless devices $204_1$, $204_2$, $204_3$, $204_4$, $204_5$, $204_6$, $204_7$ ... $204_n$ may refer generally to an end terminal (user) that attaches to the wireless communication network 200, and may refer to either a MTC device (e.g., a smart meter) or a non-MTC device. Further, the term "wireless device" is generally intended to be synonymous with the term mobile device, mobile station (MS). "User Equipment," or UE, as that term is used by 3GPP, and includes standalone wireless devices, such as terminals, cell phones, smart phones, tablets, cellular IoT devices, IoT devices, and wireless-equipped personal digital assistants, as well as wireless cards or modules that are designed for attachment to or insertion into another electronic device, such as a personal computer, electrical meter, etc.

Likewise, unless the context clearly indicates otherwise, the term RAN node $202_1$ and $202_2$ (wireless access node $202_1$ and $202_2$) is used herein in the most general sense to refer to a base station, a wireless access node, or a wireless access point in a wireless communication network 200, and may refer to RAN nodes $202_1$ and $202_2$ that are controlled by a physically distinct radio network controller as well as to more autonomous access points, such as the so-called evolved Node Bs (eNodeBs) in Long-Term Evolution (LTE) networks.

Each wireless device $204_1$, $204_2$, $204_3$, $204_4$, $204_5$, $204_6$, $204_7$ ... $204_n$ may include a transceiver circuit $210_1$, $210_2$, $210_3$, $210_4$, $210_5$, $210_6$, $210_7$ ... $210_n$ for communicating with the RAN nodes $202_1$ and $202_2$, and a processing circuit $212_1$, $212_2$, $212_3$, $212_4$, $212_5$, $212_6$, $212_7$ ... $212_n$ for processing signals transmitted from and received by the transceiver circuit $210_1$, $210_2$, $210_3$, $210_4$, $210_5$, $210_6$, $210_7$ ... $210_n$ and for controlling the operation of the corresponding wireless device $204_1$, $204_2$, $204_3$, $204_4$, $204_5$, $204_6$, $204_7$ ... $204_n$. The transceiver circuit $210_1$, $210_2$, $210_3$, $210_4$, $210_5$, $210_6$, $210_7$ ... $210_n$ may include a transmitter $214_1$, $214_2$, $214_3$, $214_4$, $214_5$, $214_6$, $214_7$ ... $214_n$ and a receiver $216_1$, $216_2$, $216_3$, $216_4$, $216_5$, $216_6$, $216_7$ ... $216_n$, which may operate according to any standard, e.g., the GSM/EDGE standard. The processing circuit $212_1$, $212_2$, $212_3$, $212_4$, $212_5$, $212_6$, $212_7$ ... $212_n$ may include a processor $218_1$, $218_2$, $218_3$, $218_4$, $218_5$, $218_6$, $218_7$ ... $218_n$ and a memory $220_1$, $220_2$, $220_3$, $220_4$, $220_5$, $220_6$, $220_7$ ... $220_n$ for storing program code for controlling the operation of the corresponding wireless device $204_1$, $204_2$, $204_3$, $204_4$, $204_5$, $204_6$, $204_7$ ... $204_n$. The program code may include code for performing the procedures as described hereinafter with respect to FIG. 9.

Each RAN node $202_1$ and $202_2$ (wireless access node $202_1$ and $202_2$) may include a transceiver circuit $222_1$ and $222_2$ for communicating with wireless devices $204_1$, $204_2$, $204_3$ ... $204_n$, a processing circuit $224_1$ and $224_2$ for processing signals transmitted from and received by the transceiver circuit $222_1$ and $222_2$ and for controlling the operation of the corresponding RAN node $202_1$ and $202_2$, and a network interface $226_1$ and $226_2$ for communicating with the core network 206. The transceiver circuit $222_1$ and $222_2$ may include a transmitter $228_1$ and $228_2$ and a receiver $230_1$ and $230_2$, which may operate according to any standard, e.g., the GSM/EDGE standard. The processing circuit $224_1$ and $224_2$ may include a processor $232_1$ and $232_2$, and a memory $234_1$ and $234_2$ for storing program code for controlling the operation of the corresponding RAN node $202_1$ and $202_2$. The program code may include code for performing the procedures as described hereinafter with respect to FIGS. 5 and 7.

The CN node 207 (e.g., SGSN 207, MME 207) may include a transceiver circuit 236 for communicating with the RAN nodes $202_1$ and $202_2$, a processing circuit 238 for processing signals transmitted from and received by the transceiver circuit 236 and for controlling the operation of the CN node 207, and a network interface 240 for communicating with the RAN nodes $202_1$ and $202_2$. The transceiver circuit 236 may include a transmitter 242 and a receiver 244, which may operate according to any standard, e.g., the GSM/EDGE standard. The processing circuit 238 may include a processor 246 and a memory 248 for storing program code for controlling the operation of the CN node 207. The program code may include code for performing the procedures as described hereinafter.

RAN Node $202_2$'s Management of EC-PCH and EC-AGCH Resources

As discussed above, the traditional BSS (traditional RAN node) employs a PCH bandwidth management strategy that is based on two key assumptions: (1) that all wireless devices are of the same coverage class, and (2) that all wireless devices in the same serving cell make use of the same DRX cycle length. Neither of these two key assumptions is applicable to the EC-GSM system, where wireless devices $204_1$, $204_2$, $204_3$, $204_4$, $204_5$, $204_6$, $204_7$ ... $204_n$ may operate in different coverage classes and may make use of different eDRX cycle lengths. As such, a new method is needed and described herein regarding how the BSS $202_2$ (note: the BSS $202_1$ plus other BSSs would operate in same manner) manage the EC-PCH bandwidth available within any given serving cell supporting EC-GSM operation considering that:

- EC-PCH messages 252 and EC-AGCH messages 254 may be available for transmission to the wireless devices $204_2$, $204_3$, $204_4$, $204_5$, $204_6$, $204_7$ ... $204_n$ at the same time.
- EC-PCH messages 252 available for wireless devices $204_2$, $204_3$, $204_4$, $204_5$, $204_6$, $204_7$ ... $204_n$ of different coverage classes may be available for transmission at the same time.
- EC-AGCH messages 254 available for wireless devices $204_2$, $204_3$, $204_4$, $204_5$, $204_6$, $204_7$ ... $204_n$ of different coverage classes may be available for transmission at the same time.
- An EC-GSM wireless device $204_2$ (for example) that wakes up according to its nominal paging group may be unable to successfully read a message 252 or 254 (e.g., an EC-PCH message 252 or EC-AGCH message 254) therein if the BSS $202_2$ (e.g., RAN node $202_2$) has used at least a portion of that bandwidth to send a message 252 or 254 to another wireless device $204_3$ (for example) of a lower coverage class.
- An EC-GSM wireless device $204_2$ (for example) that experiences multiple consecutive failures when attempting to read a message 252 or 254 (according to the EC-GSM wireless device's coverage class) may unnecessarily invoke processing used to confirm the suitability of the serving cell from a signal strength perspective and thereby unnecessarily consume battery energy.

The BSS $202_2$ (RAN node $202_2$) can address these challenges by implementing a new method and using a Page Mode field 251 (or an equivalent RAT specific field) and a used_downlink_coverage_class field 253 within EC-PCH messages 252 and EC-AGCH messages 254 to manage the paging bandwidth to the wireless devices $204_2$, $204_3$, $204_4$, $204_5$, $204_6$, $204_7 \ldots 204_n$ in extended coverage. The legacy PCH and AGCH messages contain a Page Mode field but its functionality is different from that described herein for Page Mode field 251 (see discussion below). The new method involves the BSS $202_2$ (e.g., RAN node $202_2$) prioritizing the transmission of EC-PCH messages 252 (e.g., paging messages 252) to wireless devices $204_2$, $204_3$, $204_4$, $204_5$, $204_6$, $204_7 \ldots 204_n$ in extended DRX (eDRX) mode over EC-AGCH messages 254 (e.g., Immediate Assignment messages 254), as well as prioritizing the transmission of paging messages 252 to wireless devices $204_2$, $204_3$, $204_4$, $204_5$, $204_6$, $204_7 \ldots 204_n$ in higher coverage classes and prioritizing paging messages 252 to wireless devices $204_2$, $204_3$, $204_4$, $204_5$, $204_6$, $204_7 \ldots 204_n$ of the same coverage class according to eDRX cycle length (e.g., wireless devices $204_2$, $204_3$, $204_4$, $204_5$, $204_6$, $204_7 \ldots 204_n$ with the longest eDRX cycle lengths are prioritized). The Page Mode field 251 (e.g., 6 bit field) is modified per the present disclosure to indicate the set of coverage classes for which paging messages 253 were available during a given time interval Y but were not sent due to BSS $202_2$ (e.g., Node B (NB) $202_2$, evolved NB (eNB) $202_2$) making paging message prioritization decisions applicable to the time interval Y. The new method also involves prioritizing the transmission of EC-AGCH messages 254 to wireless devices $204_2$, $204_3$, $204_4$, $204_5$, $204_6$, $204_7 \ldots 204_n$ in higher coverage classes when only EC-AGCH messages 254 are available for transmission (note: there are exceptions to this prioritization as discussed below). Further, the new method also involves prioritizing the transmission of an EC-AGCH message 254 over EC-PCH messages 252 when the EC-AGCH message 254 was previously delayed due to the prioritize operation. The new method also has other features described in detail herein after.

The proposed new method for managing the EC-PCH bandwidth provides many benefits some of which are as follows:

Prioritizing the transmission of EC-PCH paging messages 252 over EC-AGCH messages 254 and prioritizing the transmission of pending EC-PCH paging messages 252 according to coverage class (i.e., the higher the coverage class, the higher the priority) allow wireless devices $204_2$, $204_3$, $204_4$, $204_5$, $204_6$, $204_7 \ldots 204_n$ that are unable to receive a valid message within their nominal paging group to reasonably conclude that there are no pending EC-PCH messages 252 for their coverage class. Such wireless devices $204_2$, $204_3$, $204_4$, $204_5$, $204_6$, $204_7 \ldots 204_n$ can therefore go back to sleep according to their eDRX cycle length without being concerned that an EC-PCH message 252 was missed or that an attempt should be made to read an additional paging opportunity (according to their coverage class). In other words, this type of prioritization helps to minimize the amount of bandwidth monitored (and therefore energy expended) by EC-GSM wireless devices $204_2$, $204_3$, $204_4$, $204_5$, $204_6$, $204_7 \ldots 204_n$ when they attempt to find a matching EC-PCH message 252 within their nominal paging group of their applicable eDRX cycle.

Prioritizing the transmission of EC-PCH paging messages 252 over EC-AGCH messages 254 and prioritizing the transmission of pending EC-PCH paging messages 252 according to eDRX cycle length (i.e., the longer the eDRX cycle length, the higher the priority) allow wireless devices $204_2$, $204_3$, $204_4$, $204_5$, $204_6$, $204_7 \ldots 204_n$ that are able to receive a valid message within their nominal paging group that addresses a different wireless device $204_2$, $204_3$, $204_4$, $204_5$, $204_6$, $204_7 \ldots 204_n$ to determine whether or not they should read additional paging opportunities (according to their coverage class) occurring shortly after their nominal paging group. In other words, this type of prioritization helps to satisfy the device reachability requirement, whereby the network (BSS $202_2$) should be able to send an EC-PCH message 252 to a wireless device $204_2$, $204_3$, $204_4$, $204_5$, $204_6$, $204_7 \ldots 204_n$ (regardless of coverage) once within its applicable eDRX cycle instead of waiting until the next occurrence of a wireless device's nominal paging group, which if it had to wait for would substantially reduce the wireless device reachability performance.

Prioritizing the transmission of EC-PCH paging messages 252 over EC-AGCH messages 254 and prioritizing the transmission of pending EC-PCH paging messages 252 according to both coverage class (i.e., the higher the coverage class, the higher the priority) and eDRX cycle length (i.e., the longer the eDRX cycle length, the higher the priority) allow the most energy-limited wireless devices $204_2$, $204_3$, $204_4$, $204_5$, $204_6$, $204_7 \ldots 204_n$ (i.e., the higher the coverage class, the more energy-limited a wireless device is) to minimize the amount of bandwidth monitored (and therefore energy expended) in an attempt to find a matching EC-PCH message 252 within each eDRX cycle. The most energy-limited wireless devices $204_2$, $204_3$, $204_4$, $204_5$, $204_6$, $204_7 \ldots 204_n$ can also be expected to have a longer eDRX cycle length. By prioritizing EC-PCH paging messages 252 according to the eDRX cycle length, the impact of failing to deliver the EC-PCH paging message 252 which leads to reduced wireless device reachability performance would also be minimized.

When there are no pending EC-PCH messages 252, then prioritizing the transmission of pending EC-AGCH messages 254 according to coverage class (i.e., the higher the coverage class, the higher the priority) allows the most energy-limited wireless devices $204_2$, $204_3$, $204_4$, $204_5$, $204_6$, $204_7 \ldots 204_n$ (i.e., the higher the coverage class, the more energy-limited a wireless device is) to minimize the amount of bandwidth monitored (and therefore energy expended) in an attempt to find a matching EC-AGCH message 254.

Although the present disclosure is discussed in the context of EC-GSM, the new RAN nodes $202_1$ and $202_2$, wireless devices $204_1$, $204_2$, $204_3$, $204_4$, $204_5$, $204_6$, $204_7 \ldots 204_n$ and methods described herein are not only applicable to EC-GSM but also applicable to any Radio Access Technology (RAT) where paging messages 252 and assignment messages 254 are sent on shared resources to wireless devices in different coverage classes which are operating in eDRX mode.

The following is a more detailed discussion about the new methods of the present disclosure:

Paging Strategy

While managing the available EC-PCH space (also known as EC-PCH bandwidth or EC-PCH resource), the BSS $202_2$ (e.g., RAN node $202_2$) is configured to decide how to prioritize paging messages 252 whenever there are more wireless devices $204_2$, $204_3$, $204_4$, $204_5$, $204_6$, $204_7$ ... $204_n$ to page than there is available EC-PCH space. This prioritization will therefore necessarily result in some wireless devices $204_2$, $204_3$, $204_4$, $204_5$, $204_6$, $204_7$ ... $204_n$ waking up to read their nominal paging group and not finding a matching paging message. As such, a paging extension feature is disclosed whereby such wireless devices $204_2$, $204_3$, $204_4$, $204_5$, $204_6$, $204_7$ ... $204_n$ can wake-up to read their nominal paging group, successfully receive a message therein addressed to a different wireless device $204_2$, $204_3$, $204_4$, $204_5$, $204_6$, $204_7$ ... $204_n$, and use additional information carried within the received message to determine that there will be another paging opportunity occurring shortly thereafter, which may potentially contain a matching paging message. To realize this paging extension feature, the BSS $202_2$ (e.g., RAN node $202_2$) can apply an EC-AGCH/EC-PCH resource management strategy as described below.

1. Prioritizing EC-PCH Messages 252 Over EC-AGCH Messages 254

If both EC-AGCH and EC-PCH messages 252 and 254 are available for transmission, then the BSS $202_2$ (e.g., RAN node $202_2$) prioritizes the transmission of EC-PCH messages 252 over EC-AGCH messages 254:

This is desirable considering that wireless devices $204_2$, $204_3$, $204_4$, $204_5$, $204_6$, $204_7$ ... $204_n$ operating with eDRX cycles will wake up very infrequently to attempt page reception using well-defined paging opportunities, whereas such wireless devices $204_2$, $204_3$, $204_4$, $204_5$, $204_6$, $204_7$ ... $204_n$ are quite flexible regarding the time period during which they can receive an expected EC-AGCH message 254.

For practical deployments of CIoT wireless devices $204_2$, $204_3$, $204_4$, $204_5$, $204_6$, $204_7$ ... $204_n$, it is expected that the percentage of small data transmissions triggered by paging will be quite small (e.g., 10%) compared to the percentage of small data transmissions autonomously triggered by CIoT wireless devices $204_2$, $204_3$, $204_4$, $204_5$, $204_6$, $204_7$ ... $204_n$. As such, the additional Temporary Block Flow (TBF) establishment delay imposed upon CIoT wireless devices $204_2$, $204_3$, $204_4$, $204_5$, $204_6$, $204_7$ ... $204_n$ expecting an EC-AGCH message 254 can be expected to be quite limited. For example, if small paging areas are used (e.g., one or two cells may be feasible for stationary CIoT wireless devices $204_2$, $204_3$, $204_4$, $204_5$, $204_6$, $204_7$ ... $204_n$) then the frequency with which prioritizing an EC-PCH message 252 over an EC-AGCH message 254 actually occurs may be low compared to the number of times for which there is no need for such prioritization and as such the average delay on EC-AGCH message 254 reception can be quite low. In addition, a CIoT wireless device $204_2$, $204_3$, $204_4$, $204_5$, $204_6$, $204_7$ ... $204_n$ expecting a pending EC-AGCH message 254 will not experience a substantial delay even if such prioritization occurs since a prioritized EC-PCH message 252 will take about one second to transmit in the worst case (i.e., for a CIoT wireless device using the highest coverage class).

This prioritization strategy does not preclude the possibility of the BSS $202_2$ (e.g., RAN node $202_2$) sending an EC-AGCH message 254 even when there are pending EC-PCH messages 252 in special circumstances, for example, when a wireless devices $204_7$ (for example) is attempting to send an exception report (e.g., an alarm report) and is waiting for a resource assignment.

The prioritization strategy regarding whether an EC-PCH message 252 or an EC-AGCH message 254 shall be transmitted can also be based on the eDRX cycle of the wireless device(s) $204_2$, $204_3$, $204_4$, $204_5$, $204_6$, $204_7$ ... $204_n$ that is (are) addressed with the EC-PCH message 252. For example, if the eDRX cycles associated with a set of one or more wireless devices $204_2$, $204_3$, $204_4$, $204_5$, $204_6$, $204_7$ ... $204_n$ for which a paging message 252 is pending is considered short, then the transmission of the EC-AGCH message 254 could be prioritized over the transmission of the EC-PCH message 252.

2. Prioritizing EC-PCH Messages 252 Based on Coverage Class

During any given time interval Y, the BSS $202_2$ (e.g., RAN node $202_2$) can prioritize the EC-PCH message 252 transmission based on coverage class such that wireless devices $204_2$, $204_3$, $204_4$, $204_5$, $204_6$, $204_7$ ... $204_n$ with the highest coverage class are prioritized (i.e., since these wireless devices are the most power-limited if they do not have access to commercial power).

This allows wireless device(s) $204_2$, $204_3$, $204_4$, $204_5$, $204_6$, $204_7$ ... $204_n$ of the same coverage class or a better coverage class (as the wireless device for which EC-PCH message 252 transmission is prioritized) that wake-up to read their nominal paging group during time interval Y to at least be able to successfully read a paging message 252 addressed to other wireless device(s) $204_2$, $204_3$, $204_4$, $204_5$, $204_6$, $204_7$ ... $204_n$.

The BSS $202_2$ (e.g., RAN node $202_2$) may include a USED_DL_COVERAGE_CLASS field 253 (e.g., a 3-bit bitmap) in all paging messages 252, thereby allowing the wireless devices $204_2$, $204_3$, $204_4$, $204_5$, $204_6$, $204_7$ ... $204_n$ that are able to read a paging message 252 to determine the coverage class of the wireless device(s) $204_2$, $204_3$, $204_4$, $204_5$, $204_6$, $204_7$ ... $204_n$ paged during time interval Y, and therefore the length of time interval Y (i.e., the number of EC-PCH radio blocks comprising the time interval Y).

The BSS $202_2$ (e.g., RAN node $202_2$) may include a Page Mode field 251 (e.g., a 6-bit bitmap) in all paging messages 252, which the BSS $202_2$ (e.g., RAN node $202_2$) uses to indicate the set of coverage classes for which paging messages 252 were available for transmission during time interval Y but were not transmitted due to the BSS's paging message prioritization decisions.

The Page Mode field 251 would therefore allow wireless devices $204_2$, $204_3$, $204_4$, $204_5$, $204_6$, $204_7$ ... $204_n$ that were able to read a paging message 252 during the time interval Y, but for which no paging message 252 was sent within their nominal paging group during this time interval Y, to decide if they should enable the paging extension feature and attempt to read another paging message 252 shortly after the end of the time interval Y. As such, based on reading this Page Mode field 251, only wireless devices $204_2$, $204_3$, $204_4$, $204_5$, $204_6$, $204_7$ ... $204_n$ in a coverage class for which an available paging message 252 was not sent would enable the paging extension feature. The wireless devices $204_2$, $204_3$, $204_4$, $204_5$, $204_6$, $204_7$ ... $204_n$ in a coverage class for which there was no available paging message 252 during time interval Y can thus avoid reading additional paging messages 252.

A wireless device $204_2$, $204_3$, $204_4$, $204_5$, $204_6$, $204_7$ ... $204_n$ that decides to enable the paging extension feature would attempt to read at least one additional paging message 252 according to the wireless device's coverage class, and thereby avoid having to wait another full eDRX cycle before being able to receive a paging message 252. Multiple additional attempts to read a paging message 252 by the wireless device $204_2$, $204_3$, $204_4$, $204_5$, $204_6$, $204_7$ ... $204_n$ could be supported by using this paging extension feature.

The specific set of EC-PCH radio blocks used when attempting to read one additional paging message 252 after the end of the time interval Y may be determined based on where a wireless device's nominal paging group occurred within the context of the set of EC-PCH radio blocks comprising the time interval Y, e.g., as described below with respect to the Paging Extension Example.

3. Prioritizing EC-PCH Messages 252 Based on eDRX Cycle Length

Prioritizing paging messages 252 for a given coverage class based on eDRX cycle length, such that the wireless device $204_2$, $204_3$, $204_4$, $204_5$, $204_6$, $204_7$ ... $204_n$ using the longest eDRX cycle are prioritized, helps to keep the delays associated with paging message 252 delivery to a minimum (i.e., wireless device reachability performance is improved).

4. Prioritizing EC-AGCH Messages 254 Based on Coverage Class

When there are no pending EC-PCH messages 252, the BSS $202_2$ (e.g., RAN node $202_2$) can prioritize transmissions of EC-AGCH messages 254 based on coverage class such that the wireless device $204_2$, $204_3$, $204_4$, $204_5$, $204_6$, $204_7$ ... $204_n$ with the highest coverage class are prioritized (i.e., since these wireless devices are the most power-limited if they do not have access to commercial power).

In addition, even if there are one or more pending EC-PCH messages 252 then the BSS $202_2$ (e.g., RAN node $202_2$) can prioritize the transmission of a pending EC-AGCH message 254 if that EC-AGCH message 254 has already been deferred one or more times (e.g., in favor of sending an EC-PCH message 252). If this occurs, then the paging extension feature would be used by the affected wireless device(s) $204_2$, $204_3$, $204_4$, $204_5$, $204_6$, $204_7$ ... $204_n$ since there will be one or more pending EC-PCH messages 252 that have been pre-empted. Further aspects of this case or other cases where the BSS $202_2$ (e.g., RAN node $202_2$) chooses to prioritize transmission of a pending EC-AGCH message 254 when there are one or more pending EC-PCH messages 252 are as follows:

If an EC-AGCH message 254 is sent over time interval Y, then the EC-AGCH message 254 can also include a Page Mode field 251, so that the BSS $202_2$ (e.g., RAN node $202_2$) can inform the wireless device(s) $204_2$, $204_3$, $204_4$, $204_5$, $204_6$, $204_7$ ... $204_n$ that were able to read an EC-AGCH message 254 during time interval Y about whether the wireless device(s) $204_2$, $204_3$, $204_4$, $204_5$, $204_6$, $204_7$ ... $204_n$ should enable the paging extension feature and attempt to read another paging message 252 shortly after the end of time interval Y.

A wireless device $204_2$, $204_3$, $204_4$, $204_5$, $204_6$, $204_7$ ... $204_n$ that decides to enable the paging extension feature should attempt to read at least one additional paging message 252 according to the wireless device's coverage class, and thereby avoid having to wait another full eDRX cycle before being able to receive a page. Multiple additional attempts to read a paging message 252 could be supported using this paging extension feature.

The BSS $202_2$ (e.g., RAN node $202_2$) can prioritize the transmission of EC-AGCH messages 254 to wireless device(s) $204_2$, $204_3$, $204_4$, $204_5$, $204_6$, $204_7$ ... $204_n$ that have requested resources for sending an exception report (e.g., an alarm) in order to minimize the delay in reporting experienced by these wireless device(s) $204_2$, $204_3$, $204_4$, $204_5$, $204_6$, $204_7$ ... $204_n$.

It is also here proposed that the BSS $202_2$ (e.g., RAN node $202_2$) transmits the EC-AGCH message 254 in such a way (e.g., by using the corresponding number of blind transmissions) that wireless device(s) $204_2$, $204_3$, $204_4$, $204_5$, $204_6$, $204_7$ ... $204_n$ in a coverage class, for which there is an available paging message 252 that cannot be transmitted due to the transmission of the EC-AGCH message 254, can read the transmitted EC-AGCH message 254 and understand the Page Mode field 251. For example, if the EC-AGCH message 254 is sent to a target wireless device A (e.g., wireless device $204_5$) in coverage class 2, thus preventing the transmission of an EC-PCH paging message 252 to wireless device B (e.g., wireless device $204_4$) in coverage class 3, the BSS $202_2$ (e.g., RAN node $202_2$) can send the EC-AGCH message 254 so that wireless devices in coverage class 3 can also read the EC-AGCH message 254 (even though strictly speaking, the EC-AGCH message 254 only needs to be transmitted according to the coverage class of the target wireless device A). By following this approach, the wireless device B in coverage class 3 can read the Page Mode field 251 in the EC-AGCH message 254 to understand that the wireless device B shall enable the paging extension feature and read an additional paging message 252.

Alternative Paging Strategy

As an option, a simpler (e.g., shorter) Page Mode field 251 can be supported, wherein less precision regarding which wireless devices $204_2$, $204_3$, $204_4$, $204_5$, $204_6$, $204_7$ ... $204_n$ are to attempt additional paging message 252 reading is supported. For example, a 3-bit Page Mode field 251 can be used as follows when a total of 6 Coverage Classes (CCs) are supported:

000: Normal conditions (no paging extension)
001: All devices to read an additional paging message
010: CC2 and lower read an additional paging message
011: CC3 and lower read an additional paging message
100: CC4 and CC5 read an additional paging message
101: CC4 read an additional paging message
110: CC5 read an additional paging message
111: CC6 read an additional paging message Paging Extension Feature Example An example is considered where the BSS $202_2$ (e.g., RAN node $202_2$) decides to transmit a paging message 252 addressing a wireless device $204_2$ (for example) of coverage class 5 during time interval Y (e.g., time interval Y includes the 16 EC-PCH radio blocks sent over two 51-multiframes, as shown in FIG. 1).

During this same time interval Y, the BSS $202_2$ (e.g., RAN node $202_2$) has paging messages 252 pending for wireless devices (e.g., wireless device $204_4$) (device A) of coverage class 3, but chooses not to send those pending coverage class 3 paging messages 252 in order to prioritize the transmission of the coverage class 5 paging message 252.

As can be seen when referring to FIG. 1 (PRIOR ART), there are four different instances of a nominal paging group corresponding to coverage class 3 wireless devices $204_4$ (device As) (i.e., 4 EC-PCH radio blocks per nominal paging group) that can occur during time interval Y.

Each of the 16 EC-PCH radio blocks sent during time interval Y contains a EC-PCH message 252, which includes per the present disclosure the USED_DL_COVERAGE_CLASS field 253 that indicates coverage class 5 (i.e., the paging message 252 addresses a coverage class 5 wireless device, in this example wireless device $204_2$) and the Page Mode field 251 that indicates coverage class 3 paging messages 252 are pending (e.g., Page Mode bitmap=001000).

Assume wireless device $204_3$ (device A) of coverage class 3 and wireless device $204_5$ (for example) (device B) of coverage class 2 both have a nominal paging group that occurs during time interval Y, and therefore both device A and device B attempt to read a paging message during time interval Y.

Device A (wireless device $204_3$) considers the third instance of the four coverage class 3 specific nominal paging groups occurring during time interval Y to be device A's nominal paging group and, as a result of reading the coverage class 5 specific paging message sent therein, decides to enable the paging extension feature.

Device A (wireless device $204_3$) therefore reads one additional paging message in the third coverage class 3 specific nominal paging group occurring after the end of time interval Y.

Based on the values of the Page Mode field 251 and the USED_DL_COVERAGE_CLASS field 253 included in the additional paging message 252 read by device A (wireless device $204_3$), device A could be subjected to making yet another attempt to read one additional paging message if device A does not find a matching paging message 252 in the third coverage class 3 specific nominal paging group occurring after the end of time interval Y.

Device B (wireless device $204_5$) considers the second instance of the eight coverage class 2 specific nominal paging groups occurring during time interval Y to be device B's nominal paging group and, as a result of reading the coverage class 5 specific paging message 252 sent therein, the device B (wireless device $204_5$) decides not to enable the paging extension feature (e.g., bit position 2 of the Page Mode bitmap is set to '0' thereby indicating that coverage class 2 devices need not enable the paging extension feature).

A wireless device $204_2, 204_3, 204_4, 204_5, 204_6, 204_7 \ldots 204_n$ that periodically performs a short synchronization procedure (e.g., as described in 3GPP TSG-GERAN Meeting #65 GP-150129, entitled "Pseudo CR 45.869—Introduction of Short and Long Sync Up Procedures", dated $9^{th}$ to $13^{th}$ of Mar., 2015—the contents of which are incorporated herein by reference for all purposes) and thereby confirms the suitability of the current serving cell (i.e., the short synchronization procedure is performed successfully each time the procedure is invoked) may reasonably conclude that it need not attempt a cell re-selection even if it is unable to successfully receive a message 252 or 254 (e.g., EC-PCH message 252 or EC-AGCH message 254) after N attempts (N<1) according to the wireless device's nominal paging group. This is because the wireless device may reasonably conclude that being unable to read any message 252 or 254 during a limited number of consecutive instances of waking up to read its nominal paging group (according to its applicable eDRX cycle) may be due to the BSS $202_2$ (e.g., RAN node $202_2$) deciding to send an EC-PCH message 252 for a lower coverage class wireless device $204_2, 204_3, 204_4, 204_5, 204_6, 204_7 \ldots 204_n$ during the time interval corresponding to each of these instances of its nominal paging groups.

Modifications to EC-PCH Paging Request Message

Figure 3:
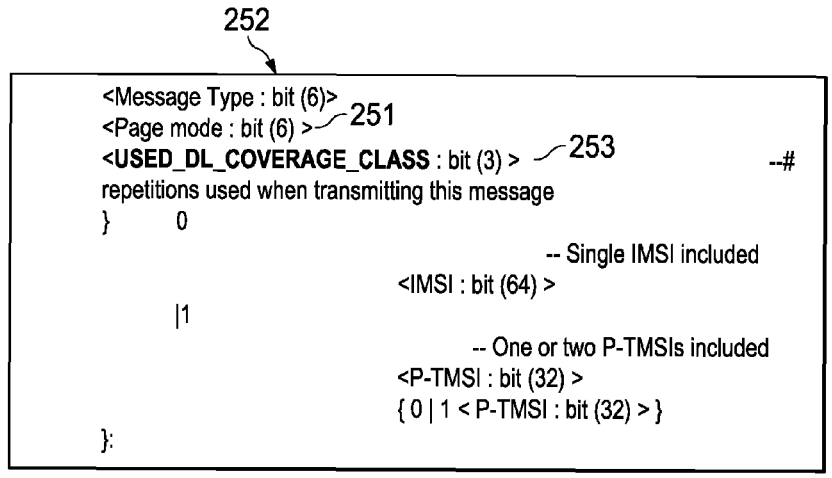
FIG. 3 is a diagram illustrating the various information elements (IE) for an exemplary EC-PCH paging message configured in accordance with an embodiment of the present disclosure.

The EC-PCH Paging Request message 252 (also referred to as the EC-PCH paging message 252) may be modified to support a 6-bit Page Mode field (i.e., instead of 2 bits as currently described in 3GPP Technical Specification (TS) 44.018 V12.5.0, entitled "Mobile radio interface layer 3 specification; Radio Resource Control (RRC) protocol (Release 12)" dated Mar. 31, 2015—the contents of which are incorporated herein by reference for all purposes) as shown in FIG. 3. FIG. 3 is a diagram illustrating the various information elements (IE) for an exemplary EC-PCH paging request message 252 configured in accordance with an embodiment of the present disclosure. The EC-PCH paging request message 252 includes various IEs including the aforementioned Page Mode field 251 and the USED_DL_COVERAGE_CLASS field 253. The Page Mode field 251 is used to allow wireless devices $204_2, 204_3, 204_4, 204_5, 204_6, 204_7 \ldots 204_n$ that are able to read a paging message 252 during their nominal paging group, but do not detect a matching paging message 252 therein, to decide if they should attempt to read another paging message 252 after the set of EC-PCH radio blocks used to send the current paging message 252 (determined by the information in the USED_DL_COVERAGE_CLASS field 253). The decision is based on the coverage class of the wireless device $204_2, 204_3, 204_4, 204_5, 204_6, 204_7 \ldots 204_n$ as indicated in the Page Mode IE. In contrast, the legacy Page Mode (PM) field included within legacy PCH and AGCH messages is 2 bits long and is coded as follows:

PM (octet 1)

Bits 0 0: Normal paging (no paging extension).

0 1: Extended paging (read the next but one PCH radio block for a possible page message).

1 0: Paging reorganization (re-read system information to see if there are changes to the number of PCH blocks per 51-multiframe of the CCCH).

1 1: Same as before.

NOTE: The value "same as before" has been defined instead of "reserved" to allow the use of this coding with another meaning in an upwards compatible way in later phases of the GSM system.

The size of the EC-PCH Paging Request message 252 can vary slightly depending on if one or two wireless devices $204_2, 204_3, 204_4, 204_5, 204_6, 204_7 \ldots 204_n$ are paged. In the worst case, when two wireless devices $204_2, 204_3, 204_4, 204_5, 204_6, 204_7 \ldots 204_n$ are paged using Packet Temporary Mobile Subscriber Identity (P-TMSI), the total length will be 81 bits (6+6 +3+1+32+1+32), which is below the 88-bit size limit of the EC-PCH paging messages 252.

Modifications to EC-AGCH Messages

Figure 4:
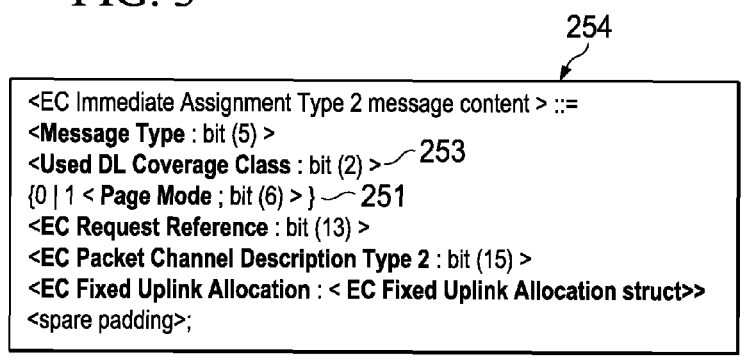
FIG. 4 is a diagram illustrating the various information elements (IE) for an exemplary EC-AGCH message configured in accordance with an embodiment of the present disclosure.

The EC-AGCH message 254 can also be modified to include a modified Paging Mode field 251 to indicate the set of coverage classes for which EC-PCH messages 252 (paging messages 252) were available during a given time interval but were not sent due to the BSS $202_2$ (e.g., RAN node $202_2$) decision to prioritize the transmission of an EC-AGCH message 254 to a wireless device $204_2$, $204_3$, $204_4$, $204_5$, $204_6$, $204_7$ ... $204_n$, e.g., due to the fact that the wireless device $204_2$, $204_3$ ... $204_n$ is attempting to send an exception report. FIG. 4 is a diagram illustrating the various information elements (IE) for an exemplary EC-AGCH message 254 configured in accordance with an embodiment of the present disclosure. The EC-AGCH message 254 includes various IEs including the aforementioned Page Mode field 251 and the USED_DL_COVERAGE_CLASS field 253.

Basic Functionalities-Configurations of RAN Node $202_2$ and Wireless Device $204_2$ (for Example)

Figure 5:
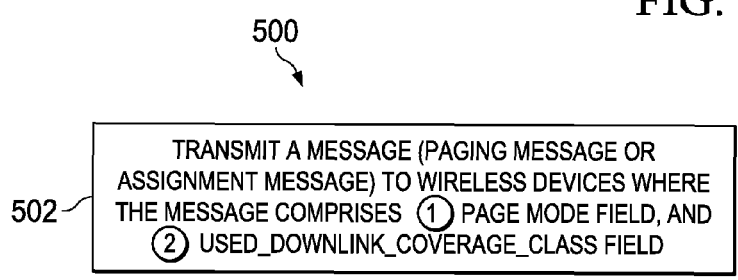
FIG. 5 is a flowchart of a basic method implemented in the RAN node in accordance with an embodiment of the present disclosure.

Referring to FIG. 5, there is a flowchart of a method 500 implemented in the RAN node $202_2$ (e.g., BSS $202_2$, NodeB $202_2$, eNodeB $202_2$) in accordance with an embodiment of the present disclosure. At step 502, the RAN node $202_2$ transmits a message 252 or 254 (e.g., paging message 252 or assignment message 254) to the wireless $204_2$, $204_3$, $204_4$, $204_5$, $204_6$, $204_7$ ... $204_n$ during a time interval, where the message 252 or 254 comprises at least the following: (i) a page mode field 251 which includes information indicating one or more coverage classes for which one or more paging messages 252 were available for transmission during the time interval but were not transmitted to the wireless devices $204_2$, $204_3$ ... $204_n$; and (ii) a used_downlink_coverage_class field 253 which includes information indicating a coverage class associated with the transmitted message 252 or 254. An exemplary technique that the RAN node $202_2$ could use to determine the particular message 252 or 254 to transmit to the wireless devices $204_2$, $204_3$, $204_4$, $204_5$, $204_6$, $204_7$ ... $204_n$ is provided below with respect to FIGS. 7-8.

Figure 6:
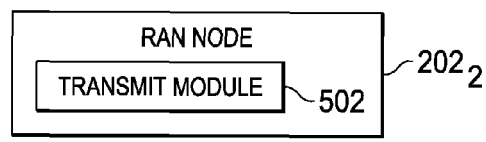
FIG. 6 is a block diagram illustrating a basic structure of the RAN node configured in accordance with an embodiment of the present disclosure.

Referring to FIG. 6, there is a block diagram illustrating structures of an exemplary RAN node $202_2$ (for example) configured in accordance with an embodiment of the present disclosure. In one embodiment, the RAN node $202_2$ comprises a transmit module 602. The transmit module 602 is configured to transmit a message 252 or 254 (e.g., paging message 252 or assignment message 254) to the wireless devices $204_2$, $204_3$, $204_4$, $204_5$, $204_6$, $204_7$ ... $204_n$ during a time interval, where the message 252 or 254 comprises at least the following: (i) a page mode field 251 which includes information indicating one or more coverage classes for which one or more paging messages 252 were available for transmission during the time interval but were not transmitted to the wireless devices $204_2$, $204_3$ ... $204_n$; and (ii) a used_downlink_coverage_class field 253 which includes information indicating a coverage class associated with the transmitted message 252 or 254. Further, it should be noted that the RAN node $102_2$ may also include other components, modules or structures which are well-known, but for clarity, only the components, modules or structures needed to describe the features of the present disclosure are described herein. The other RAN node $202_1$ can also be configured in a similar manner with the illustrated structure of the RAN node $202_2$.

As those skilled in the art will appreciate, the above-described module 602 of the RAN node $202_2$ (e.g., BSS $202_2$, NodeB $202_2$, eNodeB $202_2$) may be implemented as a dedicated circuit. Further, the module 602 can also be implemented using any number of dedicated circuits through functional combination or separation. In some embodiments, the module 602 may be even implemented by a single application specific integrated circuit (ASIC). As an alternative software-based implementation, the RAN node $202_2$ may comprise a memory $234_2$, a processor $232_2$ (including but not limited to a microprocessor, a microcontroller or a Digital Signal Processor (DSP), etc.) and a transceiver $222_2$. The memory $234_2$ stores machine-readable program code executable by the processor $232_2$ to cause the RAN node $202_2$ (e.g., BSS $202_2$, NodeB $202_2$, eNodeB $202_2$) to perform the step of the above-described method 500. It should be appreciated that the other RAN nodes $202_1$ (for example) can also be configured in a similar manner as the RAN node $202_2$ to perform method 500.

Figure 7:
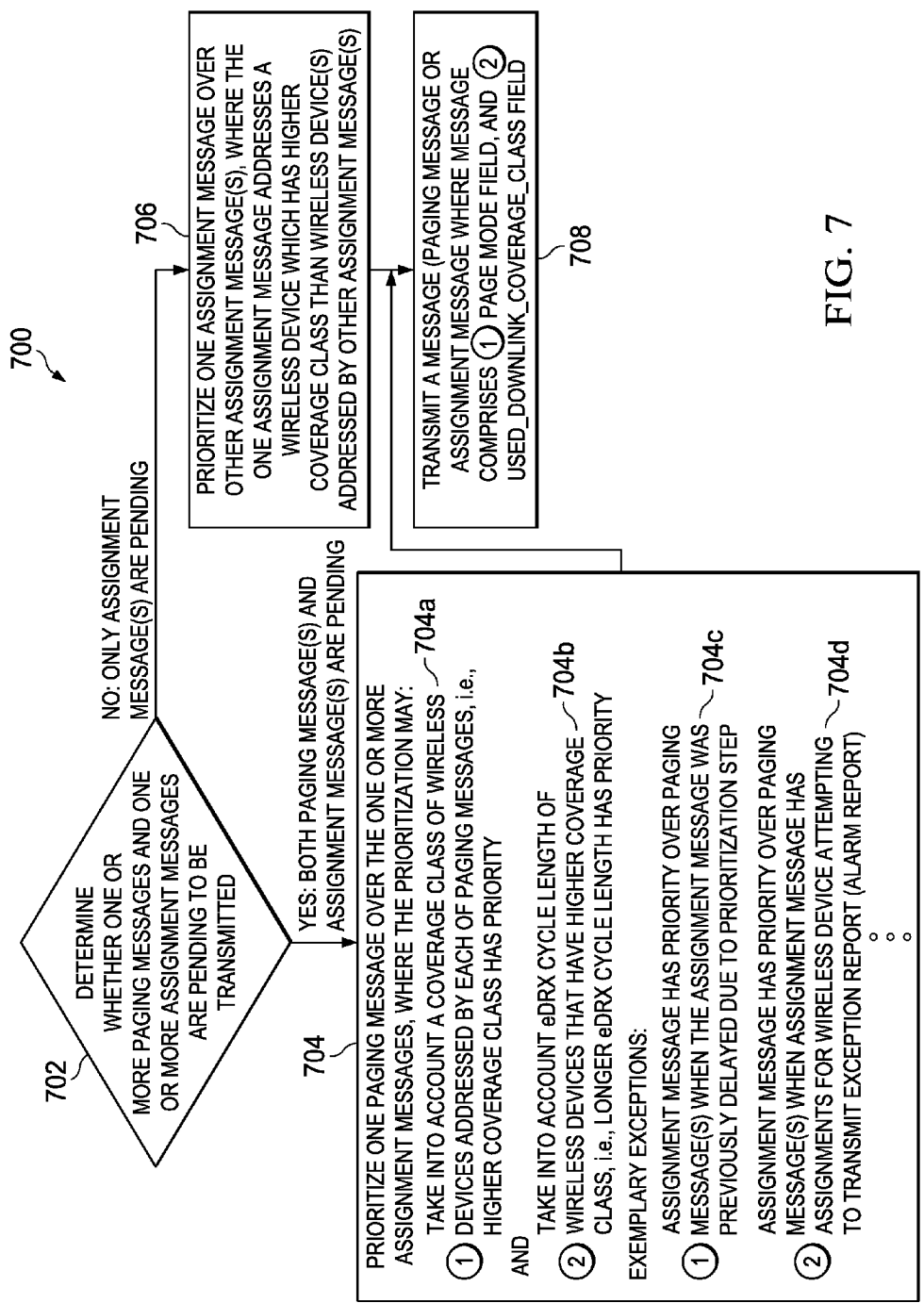
FIG. 7 is a flowchart of a more detailed method implemented in the RAN node in accordance with an embodiment of the present disclosure.

Referring to FIG. 7, there is a flowchart of a method 700 implemented in the RAN node $202_2$ (e.g., BSS $202_2$, NodeB $202_2$, eNodeB $202_2$) in accordance with an embodiment of the present disclosure. At step 702, the RAN node $202_2$ determines whether one or more paging messages 252 and one or more assignment messages 254 are pending to be transmitted. At step 704, the RAN node $202_2$ based on the determination of step 702 that there is one or more paging messages 252 and one or more assignment messages 254 pending to be transmitted (i.e., both paging message(s) 252 and assignment message(s) 254 are pending to be transmitted), prioritizes one paging message 252 of the one or more paging messages 252 over the one or more assignment messages 254. Further, the RAN node $202_2$ when performing the prioritization step 704 may take into account a coverage class of one or more of the wireless devices $204_2$, $204_3$, $204_4$, $204_5$, $204_6$, $204_7$ ... $204_n$ addressed by each of the one or more paging messages 252 such that the one paging message 252 that will be transmitted addresses one or more of the wireless devices $204_2$, $204_3$, $204_4$, $204_5$, $204_6$, $204_7$ ... $204_n$ (e.g., wireless devices $204_2$ and $204_3$) that have a higher coverage class (e.g., CC5) than the coverage classes of one or more of the wireless devices $204_2$, $204_3$, $204_4$, $204_5$, $204_6$, $204_7$ ... $204_n$ (e.g., wireless devices $204_4$, $204_5$, $204_6$, $204_7$ ... $204_n$) addressed by the other one or more paging messages 252 (step 704a). The RAN node $202_2$ may also take into account an eDRX cycle length of the one or more of the wireless devices wireless devices $204_2$ and $204_3$(for example) that have the higher coverage class (e.g., CC5) such that the one paging message 252 that is transmitted addresses one or more of the wireless devices $204_2$ (for example) that have a longer eDRX cycle length than the eDRX cycle lengths of the remaining one or more of the wireless devices $204_3$(for example) that have the higher coverage class (e.g., CC5) (step 704b). In addition, the RAN node $202_2$ when performing the prioritization step 704 may be configured such that the one paging message 252 is not prioritized over one assignment message 254 of the one or more assignment messages 254 when a transmission of the one assignment message 254 to one of the wireless devices $204_2$, $204_3$, $204_4$, $204_5$, $204_6$, $204_7$ ... $204_n$ (e.g., wireless device $204_6$) was previously delayed due to a previous prioritization step 704 (step 704c). Moreover, the RAN node $202_2$ when performing the prioritization step 704 may be configured such that the one paging message 252 is not prioritized over one assignment message 254 of the one or more assignment messages 254 when the one assignment message 254 includes resource assignments for one of the wireless devices $204_2$, $204_3$, $204_4$, $204_5$, $204_6$, $204_7$ ... $204_n$ (e.g., wireless device $204_7$) that is attempting to transmit an exception report (e.g., alarm report) (step 704d). There are other exceptions to the prioritization step 704 as described above where an assignment message 254 can be transmitted before a paging message 252.

At step 706, the RAN node $202_2$ based on the determination of step 702 that there are no paging messages 252 and one or more assignment messages 254 pending to be transmitted (i.e., only assignment message(s) 254 are pending to be transmitted), prioritizes one assignment message 254 over the other one or more assignment messages 254. Further, the RAN node $202_2$ when performing the prioritization step 706 may prioritize one assignment message 254 of the one or more assignment messages 254 such that the one assignment message 254 that is transmitted addresses the wireless device $204_2$, $204_3$, $204_4$, $204_5$, $204_6$, $204_7$ ... $204_n$ that has a higher coverage class than the wireless device $204_2$, $204_3$, $204_4$, $204_5$, $204_6$, $204_7$ ... $204_n$ addressed by the other one or more assignment messages 254.

After performing step 704 or step 706, the RAN node $202_2$ at step 708 transmits a message 252 or 254 (e.g., paging message 252 or assignment message 254) to the wireless devices $204_2$, $204_3$, $204_4$, $204_5$, $204_6$, $204_7$ ... $204_n$ during a time interval, where the message 252 or 254 comprises at least the following: (i) a page mode field 251 which includes information indicating one or more coverage classes for which one or more paging messages 252 were available for transmission during the time interval but were not transmitted to the wireless devices $204_2$, $204_3$, $204_4$, $204_5$, $204_6$, $204_7$ ... $204_n$; and (ii) a used_downlink_coverage_class field 253 which includes information indicating a coverage class associated with the transmitted message 252 or 254.

Figure 8:
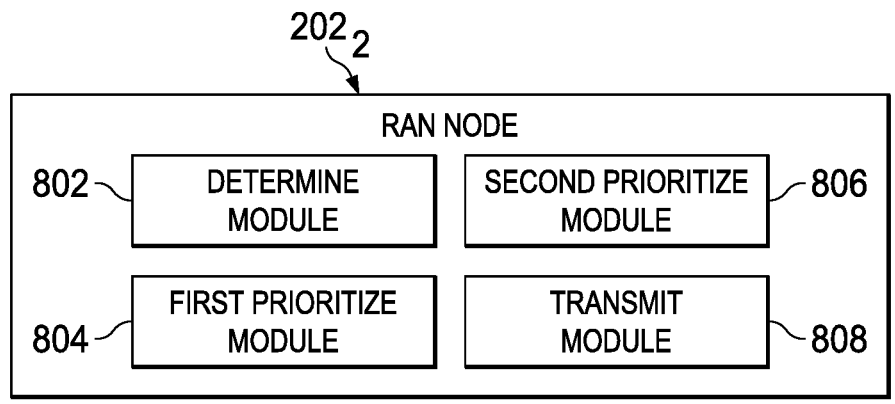
FIG. 8 is a block diagram illustrating a more detailed structure of the RAN node configured in accordance with an embodiment of the present disclosure.

Referring to FIG. 8, there is a block diagram illustrating structures of an exemplary RAN node $202_2$ (for example) configured in accordance with an embodiment of the present disclosure. In one embodiment, the RAN node $202_2$ comprises a determine module 802, a first prioritize module 804, a second prioritize module 806, and a transmit module 808. The determine module 802 is configured to determine whether one or more paging messages 252 and one or more assignment messages 254 are pending to be transmitted. The first prioritize module 804 is configured to, based on the determination by the determination module 802 that there is one or more paging messages 252 and one or more assignment messages 254 pending to be transmitted (i.e., both paging message(s) 252 and assignment message(s) 254 are pending to be transmitted), prioritize one paging message 252 of the one or more paging messages 252 over the one or more assignment messages 254. The first prioritize module 804 may be configured to take into account a coverage class of one or more of the wireless devices $204_2$, $204_3$, $204_4$, $204_5$, $204_6$, $204_7$ ... $204_n$ addressed by each of the one or more paging messages 252 such that the one paging message 252 that will be transmitted addresses one or more of the wireless devices $204_2$, $204_3$, $204_4$, $204_5$, $204_6$, $204_7$ ... $204_n$ (e.g., wireless devices $204_2$ and $204_3$) that have a higher coverage class (e.g., CC5) than the coverage classes of one or more of the wireless devices $204_2$, $204_3$, $204_4$, $204_5$, $204_6$, $204_7$ ... $204_n$ (e.g., wireless devices $204_4$, $204_5$, $204_6$, $204_7$ ... $204_n$) addressed by the other one or more paging messages 252. The first prioritize module 804 may be configured to also take into account an eDRX cycle length of the one or more of the wireless devices wireless devices $204_2$ and $204_3$ (for example) that have the higher coverage class (e.g., CC5) such that the one paging message 252 that is transmitted addresses one or more of the wireless devices $204_2$ (for example) that have a longer eDRX cycle length than the eDRX cycle lengths of the remaining one or more of the wireless devices $204_3$ (for example) that have the higher coverage class (e.g., CC5). In addition, the first prioritize module 804 may be configured such that the one paging message 252 is not prioritized over one assignment message 254 of the one or more assignment messages 254 when a transmission of the one assignment message 254 to one of the wireless devices $204_2$, $204_3$, $204_4$, $204_5$, $204_6$, $204_7$ ... $204_n$ (e.g., wireless device $204_6$) was previously delayed due to a previous prioritization step 704. Moreover, the first prioritize module 804 may be configured such that the one paging message 252 is not prioritized over one assignment message 254 of the one or more assignment messages 254 when the one assignment message 254 includes resource assignments for one of the wireless devices $204_2$, $204_3$, $204_4$, $204_5$, $204_6$, $204_7$ ... $204_n$ (e.g., wireless device $204_7$) that is attempting to transmit an exception report (e.g., alarm report).

The second prioritize module 806 is configured to, based on the determination by the determination module 802 that there are no paging messages 252 and one or more assignment messages 254 pending to be transmitted (i.e., only assignment message(s) 254 are pending to be transmitted), prioritize one assignment message 254 over the other one or more assignment messages 254. Further, the second prioritize module 806 may prioritize the one assignment message 254 of the one or more assignment messages 254 such that the one assignment message 254 that is transmitted addresses the wireless device $204_2$, $204_3$, $204_4$, $204_5$, $204_6$, $204_7$ ... $204_n$ that has a higher coverage class than the wireless device $204_2$, $204_3$, $204_4$, $204_5$, $204_6$, $204_7$ ... $204_n$ addressed by the other one or more assignment messages 254.

The transmit module 808 is configured to transmit a message 252 or 254 (e.g., paging message 252 or assignment message 254) to the wireless devices $204_2$, $204_3$, $204_4$, $204_5$, $204_6$, $204_7$ ... $204_n$ during a time interval, where the message 252 or 254 comprises at least the following: (i) a page mode field 251 which includes information indicating one or more coverage classes for which one or more paging messages 252 were available for transmission during the time interval but were not transmitted to the wireless devices $204_2$, $204_3$, $204_4$, $204_5$, $204_6$, $204_7$ ... $204_n$; and (ii) a used_downlink_coverage_class field 253 which includes information indicating a coverage class associated with the transmitted message 252 or 254. It should be noted that the RAN node $102_2$ may also include other components, modules or structures which are well-known, but for clarity, only the components, modules or structures needed to describe the features of the present disclosure are described herein. The other RAN node $202_1$ can also be configured in a similar manner with the illustrated structure of the RAN node $202_2$.

As those skilled in the art will appreciate, the above-described modules 802, 804, 806, and 808 of the RAN node $202_2$ (e.g., BSS $202_2$, NodeB $202_2$, eNodeB $202_2$) may be implemented separately as suitable dedicated circuits. Further, the modules 802, 804, 806, and 808 can also be implemented using any number of dedicated circuits through functional combination or separation. In some embodiments, the modules 802, 804, 806, and 808 may be even combined in a single application specific integrated circuit (ASIC). As an alternative software-based implementation, the RAN node $202_2$ may comprise a memory $234_2$, a processor $232_2$ (including but not limited to a microprocessor, a microcontroller or a Digital Signal Processor (DSP), etc.) and a transceiver $222_2$. The memory $234_2$ stores machine-readable program code executable by the processor $232_2$ to cause the RAN node $202_2$ (e.g., BSS $202_2$, NodeB $202_2$, eNodeB $202_2$) to perform the steps of the above-described method 700. It should be appreciated that the other RAN nodes $202_1$ (for example) can also be configured in a similar manner as the RAN node $202_2$ to perform method 700.

Figure 9:
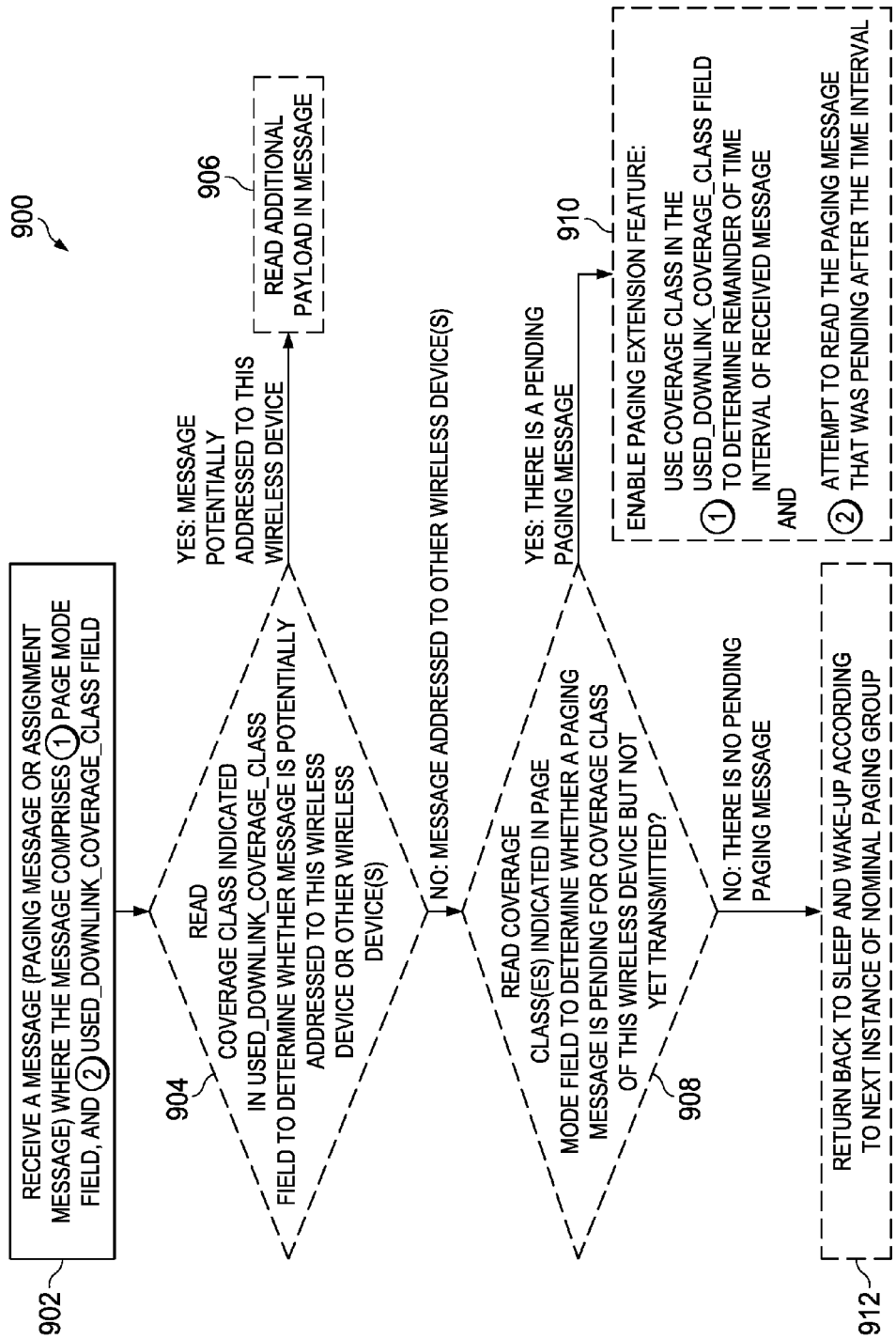
FIG. 9 is a flowchart of a method implemented in the wireless device in accordance with an embodiment of the present disclosure; and, FIG. 10 is a block diagram illustrating an exemplary structure of the wireless device configured in accordance with an embodiment of the present disclosure.

Referring to FIG. 9, there is a flowchart of a method 900 implemented in the wireless device $204_2$ (for example) in accordance with an embodiment of the present disclosure. At step 902, the wireless device $204_2$ receives a message 252 or 254 (e.g., paging message 252 or assignment message 254) from the RAN node $202_2$ during a time interval, where the message 252 or 254 comprises at least the following: (i) a page mode field 251 which includes information indicating one or more coverage classes for which one or more paging messages 252 were available for transmission by the RAN node $202_2$ during the time interval but were not transmitted; and (ii) a used_downlink_coverage_class field 253 which includes information indicating a coverage class associated with the one or more wireless devices $204_2$, $204_3$, $204_4$, $204_5$, $204_6$, $204_7$ ... $204_n$ addressed in the received message 252 or 254. At step 904, the wireless device $204_2$ reads the coverage class indicated in the used_downlink_coverage_class field 253 of the message 252 or 254 to determine whether the message 252 or 254 is potentially addressed to the wireless device $204_2$ or to some other wireless devices $204_3$, $204_4$, $204_5$, $204_6$, $204_7$ ... $204_n$. For example, the wireless device $204_2$ to determine if the message 252 or 254 is potentially a paging message addressed to it may read the a message type field along with the used_downlink_coverage_class field 253 and if the message type field indicates a paging message and the used_downlink_coverage_class field 253 indicates the same coverage class as the wireless device $204_2$ then the received message 252 may potentially be a paging message 252 addressed to the wireless device $204_2$. At step 906, the wireless device $204_2$ based on the determination of step 904 that the message 252 or 254 is potentially addressed to the wireless device $204_2$ reads additional payload in the received message 252 or 254 (Note: the used_downlink_coverage_class field 253 is part of the message payload). At step 908, the wireless device $204_2$ based on the determination of step 904 that the message 252 or 254 is addressed to some other wireless devices $204_3$, $204_4$, $204_5$, $204_6$, $204_7$ ... $204_n$ reads the one or more coverage classes indicated by the page mode field 251 to determine whether a paging message 252 is pending for the coverage class of the wireless device $204_2$ but has not yet been transmitted by the RAN node $202_2$. At step 910, the wireless device $204_2$ based on the determination of step 908 that a paging message 252 is pending for the coverage class of the wireless device $204_2$ but has not yet been transmitted by the RAN node $202_2$ enables a paging extension process where the wireless device $204_2$ is operable to: (i) use the coverage class indicated in the used_downlink_coverage_class field 253 to determine a remainder of the time interval associated with the received message 252 or 254; and (ii) attempt to read the paging message 252 that was pending after the time interval. At step 912, the wireless device $204_2$ based on the determination of step 908 that a paging message 252 is not pending for the coverage class of the wireless device $204_2$ returns back to sleep and wakes up according to a next instance of a nominal paging group of the wireless device $204_2$.

Figure 10:
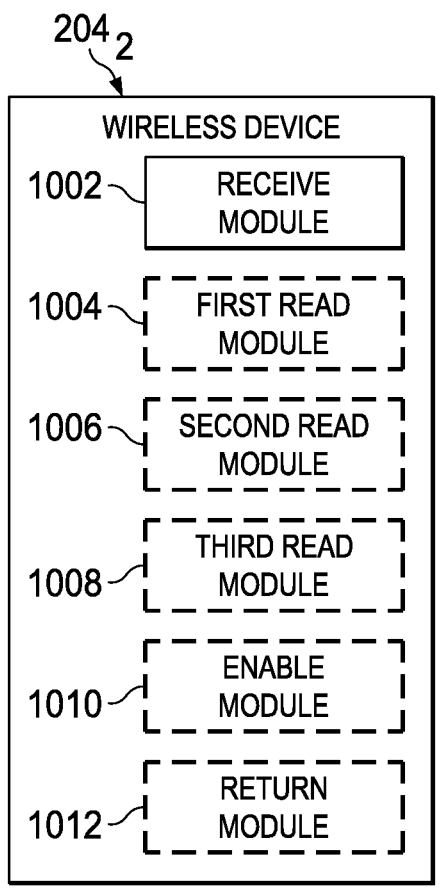

Referring to FIG. 10, there is a block diagram illustrating structures of an exemplary wireless device $204_2$ (for example) configured in accordance with an embodiment of the present disclosure. In one embodiment, the wireless device $204_2$ comprises a receive module 1002, a first read module 1004, a second read module 1006, a third receive module 1008, an enable module 1010, and a return module 1012. The receive module 1002 is configured to receive a message 252 or 254 (e.g., paging message 252 or assignment message 254) from the RAN node $202_2$ during a time interval, where the message 252 or 254 comprises at least the following: (i) a page mode field 251 which includes information indicating one or more coverage classes for which one or more paging messages 252 were available for transmission by the RAN node $202_2$ during the time interval but were not transmitted; and (ii) a used_downlink_coverage_class field 253 which includes information indicating a coverage class associated with the one or more wireless devices $204_2$, $204_3$, $204_4$, $204_5$, $204_6$, $204_7$ ... $204_n$ addressed in the received message 252 or 254. The first read module 1004 is configured to read the coverage class indicated in the used_downlink_coverage_class field 253 of the message 252 or 254 to determine whether the message 252 or 254 is potentially addressed to the wireless device $204_2$ or to some other wireless devices $204_3$, $204_4$, $204_5$, $204_6$, $204_7$ ... $204_n$. For example, the first read module 1004 in determining if the message 252 or 254 is potentially a paging message addressed to the wireless device $204_2$ may read the a message type field along with the used_downlink_coverage_class field 253 and if the message type field indicates a paging message and the used_downlink_coverage_class field 253 indicates the same coverage class as the wireless device $204_2$ then the received message 252 may potentially be a paging message 252 addressed to the wireless device $204_2$. The second read module 1006 is configured, based on the determination that the message 252 or 254 is potentially addressed to the wireless device $204_2$, to read a payload in the received message 252 or 254. The third read module 1008 is configured based on the determination that the message 252 or 254 is addressed to some other wireless devices $204_3$, $204_4$, $204_5$, $204_6$, $204_7$ ... $204_n$ to read the one or more coverage classes indicated by the page mode field 251 to determine whether a paging message 252 is pending for the coverage class of the wireless device $204_2$ but has not yet been transmitted by the RAN node $202_2$. The enable module 1010 is configured, based on the determination that a paging message 252 is pending for the coverage class of the wireless device $204_2$ but has not yet been transmitted by the RAN node $202_2$, to enable a paging extension process where the enable module 1010 is further configured to: (i) use the coverage class indicated in the used_downlink_coverage_class field 253 to determine a remainder of the time interval associated with the received message 252 or 254; and (ii) attempt to read the paging message 252 that was pending after the time interval. The return module 1012 is configured based on the determination that a paging message 252 is not pending for the coverage class of the wireless device $204_2$ to return back to sleep and wakes up according to a next instance of a nominal paging group of the wireless device $204_2$. It should be noted that the wireless device $204_2$ may also include other components, modules or structures which are well-known, but for clarity, only the components, modules or structures needed to describe the features of the present disclosure are described herein. The other wireless devices $204_1$, $204_3$, $204_4$, $204_5$, $204_6$, $204_7$ ... $204_n$ also be configured in a similar manner with the illustrated structure of the wireless device $204_2$.

As those skilled in the art will appreciate, the above-described modules 1002, 1004, 1006, 1008, 1010, and 1012 of the wireless device $204_2$ may be implemented separately as suitable dedicated circuits. Further, the modules 1002, 1004, 1006, 1008, 1010, and 1012 can also be implemented using any number of dedicated circuits through functional combination or separation. In some embodiments, the modules 1002, 1004, 1006, 1008, 1010, and 1012 may be even combined in a single application specific integrated circuit (ASIC). As an alternative software-based implementation, the wireless device $204_2$ may comprise a memory 2202, a processor $218_2$ (including but not limited to a microprocessor, a microcontroller or a Digital Signal Processor (DSP), etc.) and a transceiver $210_2$. The memory $220_2$ stores machine-readable program code executable by the processor $218_2$ to cause the wireless device $204_2$ to perform the steps of the above-described method 900. It should be appreciated that the other wireless devices $204_1$, $204_3$, $204_4$, $204_5$, $204_6$, $204_7 \ldots 204_n$ can also be configured in a similar manner as the wireless device $204_2$ to perform method 900.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A radio access network (RAN) node configured to interact with a plurality of wireless devices, the RAN node comprising:
a processor; and,
a memory that stores processor-executable instructions, wherein the processor interfaces with the memory to execute the processor-executable instructions, whereby the radio access network node is operable to:
transmit, to the plurality of wireless devices, a message which comprises at least the following: (i) a page mode field which includes information indicating one or more coverage classes for which one or more paging messages were available for transmission during a time interval but were not transmitted to the plurality of wireless devices; and (ii) a used_downlink_coverage_class field which includes information indicating a coverage class associated with the transmitted message.

2. The RAN node of claim 1, wherein the one or more paging messages available for transmission during the time interval were not transmitted to the plurality of wireless devices due to the RAN node making paging message prioritization decisions applicable to the time interval.

3. The RAN node of claim 1, wherein the RAN node prior to the transmit operation is operable to:
determine whether one or more paging messages and one or more assignment messages are pending to be transmitted; and
based on the determination that there are one or more paging messages and one or more assignment messages pending to be transmitted, prioritize one paging message of the one or more paging messages over the one or more assignment messages such that the message transmitted in the transmit operation is a paging message rather than an assignment message.

4. The RAN node of claim 3, wherein the RAN node is operable to perform the prioritize operation to further take into account a coverage class of one or more of the wireless devices addressed by each of the one or more paging messages such that the one paging message that is transmitted addresses one or more of the wireless devices that have a higher coverage class than the coverage classes of one or more of the wireless devices addressed by the other one or more paging messages.

5. The RAN node of claim 4, wherein the RAN node is operable to perform the prioritize operation to further take into account an Extended Discontinuous Receive Cycle (eDRX) cycle length of the one or more of the wireless devices that have the higher coverage class such that the one paging message that is transmitted addresses one or more of the wireless devices that have a longer eDRX cycle length than the eDRX cycle lengths of the remaining one or more of the wireless devices that have the higher coverage class.

6. The RAN node of claim 3, wherein the RAN node is operable to perform a second prioritize operation such that a paging message is not prioritized over an assignment message of the one or more assignment messages when a transmission of the assignment message was previously delayed due to the previous prioritize operation such that a later message transmitted is an assignment message rather than a paging message.

7. The RAN node of claim 1, wherein the RAN node prior to the transmit operation is operable to:
determine whether one or more paging messages and one or more assignment messages are pending to be transmitted; and
based on the determination that there are one or more paging messages and one or more assignment messages pending to be transmitted, prioritize one assignment message of the one or more assignment messages over the one or more paging messages when the one assignment message includes resource assignments for one of the wireless devices that is attempting to transmit an exception report.

8. The RAN node of claim 1, wherein the RAN node prior to the transmit operation is operable to:
determine whether one or more paging messages and one or more assignment messages are pending to be transmitted; and
based on the determination that there is one or more assignment messages pending to be transmitted and no paging message is pending to be transmitted, prioritize one assignment message of the one or more assignment messages such that the one assignment message that is transmitted in the transmit operation addresses a wireless device that has a higher coverage class than a coverage class of a wireless device addressed by the other one or more assignment messages.

9. The RAN node of claim 1, wherein the RAN node is one of the following: a Base Station Subsystem (BSS), a Node B, and an evolved Node B.

10. A method in a radio access network (RAN) node configured to interact with a plurality of wireless devices, the method comprising:
transmitting, to the plurality of wireless devices, a message which comprises at least the following: (i) a page mode field which includes information indicating one or more coverage classes for which one or more paging messages were available for transmission during a time interval but were not transmitted to the plurality of wireless devices; and (ii) a used_downlink_coverage_class field which includes information indicating a coverage class associated with the transmitted message.

11. The method of claim 10, wherein the one or more paging messages available for transmission during the time interval were not transmitted to the plurality of wireless devices due to the RAN node making paging message prioritization decisions applicable to the time interval.

12. The method of claim 10, wherein prior to the transmitting step further comprising:
determining whether one or more paging messages and one or more assignment messages are pending to be transmitted; and
based on the determination that there are one or more paging messages and one or more assignment messages pending to be transmitted, prioritizing one paging message of the one or more paging messages over the one or more assignment messages such that the message transmitted in the transmitting step is a paging message rather than an assignment message.

13. The method of claim 12, wherein the prioritizing step further takes into account a coverage class of one or more of the wireless devices addressed by each of the one or more paging messages such that the one paging message that is transmitted addresses one or more of the wireless devices that have a higher coverage class than the coverage classes of one or more of the wireless devices addressed by the other one or more paging messages.

14. The method of claim 13, wherein the prioritizing step further takes into account an Extended Discontinuous Receive Cycle (eDRX) cycle length of the one or more of the wireless devices that have the higher coverage class such that the one paging message that is transmitted addresses one or more of the wireless devices that have a longer eDRX cycle length than the eDRX cycle lengths of the remaining one or more of the wireless devices that have the higher coverage class.

15. The method of claim 12, further comprising a second prioritizing step wherein a paging message is not prioritized over an assignment message of the one or more assignment messages when a transmission of the assignment message was previously delayed due to the previous prioritizing step such that a later message transmitted is an assignment message rather than a paging message.

16. The method of claim 10, wherein prior to the transmitting step further comprising:
determining whether one or more paging messages and one or more assignment messages are pending to be transmitted; and
based on the determination that there are one or more paging messages and one or more assignment messages pending to be transmitted, prioritizing one assignment message of the one or more assignment messages over the one or more paging messages when the one assignment message includes resource assignments for one of the wireless devices that is attempting to transmit an exception report.

17. The method of claim 10, wherein prior to the transmitting step further comprising:
determining whether one or more paging messages and one or more assignment messages are pending to be transmitted; and
based on the determination that there is one or more assignment messages pending to be transmitted and no paging message is pending to be transmitted, prioritizing one assignment message of the one or more assignment messages such that the one assignment message that is transmitted in the transmitting step addresses a wireless device that has a higher coverage class than a coverage class of a wireless device addressed by the other one or more assignment messages.

18. The method of claim 10, wherein the RAN node is one of the following: a Base Station Subsystem (BSS), a Node B, and an evolved Node B.

19. A wireless device configured to interact with a radio access network (RAN) node, the wireless device comprising:
a processor; and,
a memory that stores processor-executable instructions, wherein the processor interfaces with the memory to execute the processor-executable instructions, whereby the wireless device is operable to:
receive, from the RAN node, a message which comprises at least the following: (i) a page mode field which includes information indicating one or more coverage classes for which one or more paging messages were available for transmission by the RAN node during a time interval but were not transmitted due to the RAN node making paging message prioritization decisions applicable to the time interval; and (ii) a used_downlink_coverage_class field which includes information indicating a coverage class associated with one or more wireless devices addressed in the received message.

* * * * *